(12) United States Patent
Fan

(10) Patent No.: US 9,004,331 B2
(45) Date of Patent: Apr. 14, 2015

(54) FIXTURE APPARATUS FOR AUTOMOTIVE AIR-CONDITIONING OUTLET

(71) Applicant: Eagle Fan, Chu-Pei (TW)

(72) Inventor: Eagle Fan, Chu-Pei (TW)

( * ) Notice: Subject to any disclaimer, the term of this patent is extended or adjusted under 35 U.S.C. 154(b) by 207 days.

(21) Appl. No.: 13/650,796

(22) Filed: Oct. 12, 2012

(65) Prior Publication Data

US 2014/0103087 A1    Apr. 17, 2014

(51) Int. Cl.
*B60R 7/06* (2006.01)
*B60R 11/02* (2006.01)
*B60R 11/00* (2006.01)

(52) U.S. Cl.
CPC .............. *B60R 11/02* (2013.01); *Y10S 224/929* (2013.01); *B60R 2011/0008* (2013.01); *B60R 2011/0059* (2013.01); *B60R 2011/0075* (2013.01); *B60R 2011/0089* (2013.01)

(58) Field of Classification Search
CPC ............ B60R 11/02; B60R 2011/0059; B60R 2011/0008; B60R 2011/0075; B60R 2011/0089; B60R 7/06; Y10S 224/929
USPC ............ 224/483, 929; 403/374.3–374.4, 321, 403/326, 350; 248/228.4, 230.4, 231.51, 248/316.5, 228.5, 230.5, 231.61, 316.1, 248/316.7, 228.7, 316.6, 230.7, 231.81
See application file for complete search history.

(56) References Cited

U.S. PATENT DOCUMENTS

| 483,963 | A | * | 10/1892 | Leger ............................... 211/37 |
| 4,162,755 | A | * | 7/1979 | Bott ............................... 224/326 |
| 2008/0224007 | A1 | * | 9/2008 | Mo .......................... 248/231.81 |
| 2010/0038509 | A1 | * | 2/2010 | Russell ..................... 248/288.11 |
| 2011/0163143 | A1 | * | 7/2011 | Zanetti .......................... 224/567 |

FOREIGN PATENT DOCUMENTS

WO    WO 2009147514 A2 * 12/2009 .............. B60R 11/02

* cited by examiner

*Primary Examiner* — Justin Larson
*Assistant Examiner* — Scott McNurlen
(74) *Attorney, Agent, or Firm* — Rabin & Berdo, P.C.

(57) ABSTRACT

A fixture apparatus for vehicle air-conditioner vent outlet is provided, including a fixing unit, a dial, a traction element, a clamp and a support element. The fixing unit is installed with the dial and limits the dial to only rotate at location. The clamp includes two coupled clips. The traction element is disposed with outer screw thread at some segment extending into the fixing unit and contacts the dial in a screw-like manner. When the dial rotates, the traction element moves linearly. One end of traction element outside of the fixing unit is coupled to the coupling position of the two clips of the clamp. The support element is coupled to outer wall of fixing unit, located on a same side of the clamp.

8 Claims, 6 Drawing Sheets

FIXTURE APPARATUS FOR AUTOMOTIVE AIR-CONDITIONING OUTLET

FIELD OF THE INVENTION

The present invention generally relates to a fixture apparatus for automotive air-conditioning outlet, and more specifically to a fixture apparatus for automotive air-conditioning outlet with fins for engaging an automotive clamping device.

BACKGROUND OF THE INVENTION

A car forms a closed space. When the air circulation is poor inside the car, the driver or passenger may feel uncomfortable. The air-conditioning system inside a vehicle addresses this problem by providing air circulation through the outlets and channels embedded in the car. In general, the air-conditioning outlet includes a window frame with a plurality of parallel and equally-spaced rectangular fins. The window frame can be adjusted to change the direction the air blows. Some outlets may have two window frames that can be adjusted independently.

In recent years, more and more portable electronic devices are reaching the market, such as, GPS, smart phone, and so on, which result in a variety of clamping devices developed for holding portable electronic devices inside a car. The clamping device is usually installed on the flat surface above the control panel or inside the window shield. The fixation of the clamping device inside the car is usually done by screw, glue or suction disc. However, the above manners usually damage the car interior or obstruct the driver's view.

An alternative is to fix the clamping device that can clamp to the fins of the air-conditioning outlet. The currently available clamping devices usually utilize the resilient force to maintain the clamping. When the driving becomes bumpy, the clamping device clamping on the fins by resilient force may disengage from the fins easily so the portable electronic device may fall and become damaged. It is therefore desirable to devise a fixture apparatus for providing better engagement to the outlet fins.

SUMMARY OF THE INVENTION

The primary object of the present invention is to provide a fixture apparatus, applicable to an automotive air-conditioning outlet, using a dial to rotate to control the applied clamping force to ensure tight clamping to the outlet so that a clamping device can be engaged to the fixture apparatus for providing clamping to a portable electronic device for convenient usage inside an automobile.

To achieve the above object, the present invention provides a fixture apparatus, including a fixing unit, a dial, a traction element, a clamp and a support element. The fixing unit is installed with the dial and limits the dial to only rotate at the location. The clamp includes two coupled clips. Each clip uses the coupling position as center, and includes a clamp wall and a guide wall on opposite sides. The guide wall contacts the outer wall of the fixing unit at the location of the dial. The traction element is disposed with outer screw thread at some segment. The segment extends into the fixing unit and contacts the dial in a screw-like manner. When the dial rotates, the traction element will move linearly. One end of the traction element outside of the fixing unit is coupled to the coupling position of the two clips of the clamp. The support element is coupled to the outer wall of the fixing unit, located on a same side of the clamp. As such, when the dial rotates and the traction element is linked to move the clamp synchronously to achieve the opening and closing of the two clips.

Furthermore, the fixing unit of the present invention includes a housing plate and a cover element. The shape of cover element depends on the device to engage with. As such, different shapes of cover elements can be used with different devices to widen the application of the present invention.

The foregoing and other objects, features, aspects and advantages of the present invention will become better understood from a careful reading of a detailed description provided herein below with appropriate reference to the accompanying drawings.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE PREFERRED EMBODIMENTS

Figure 1:
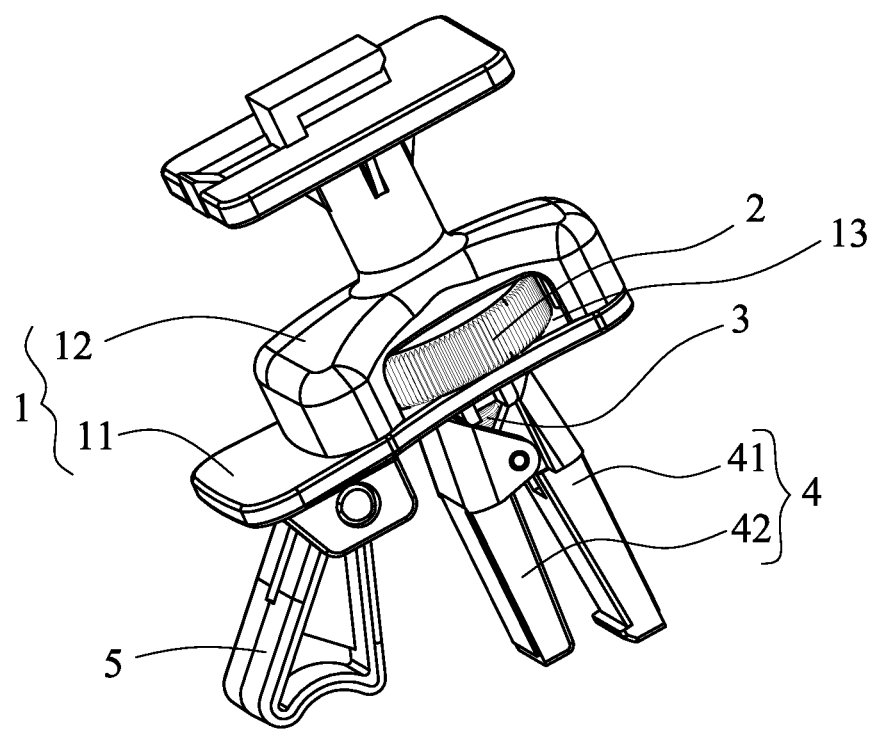
FIG. 1 shows a schematic view of the present invention.

FIG. 1 shows a schematic view of the present invention. A fixture apparatus of the present invention includes a fixing unit 1, a dial 2, a traction element 3, a clamp 4 and a support element 5. The fixing unit 1 is installed with the dial 2. The traction element 3 includes outer screw thread and is engaged to center of dial 2. The clamp 4 includes two clips 41, 42 partially coupled. The other end of traction element 3 is coupled to coupling position of two clips 41, 42. When the dial 21 is rotated, the traction element 3 is drawn to move linearly. The traction element 3 then draws the clamp 4 to move synchronously to achieve the opening and closing of the two clips 41, 42. The support element 5 is coupled to the fixing unit 1 at a location on a same side of the clamp 5. In this manner, when the fixture apparatus of the present invention is installed at the air-conditioning outlet, the clamp 4 clamps onto the fins of the outlet and the support element 5 contacts the wall around the outlet to keep fixing unit 1 stay in a vertical position to allow engagement to other device so as to achieve the object of holding portable electronic device inside a vehicle.

Figure 2:
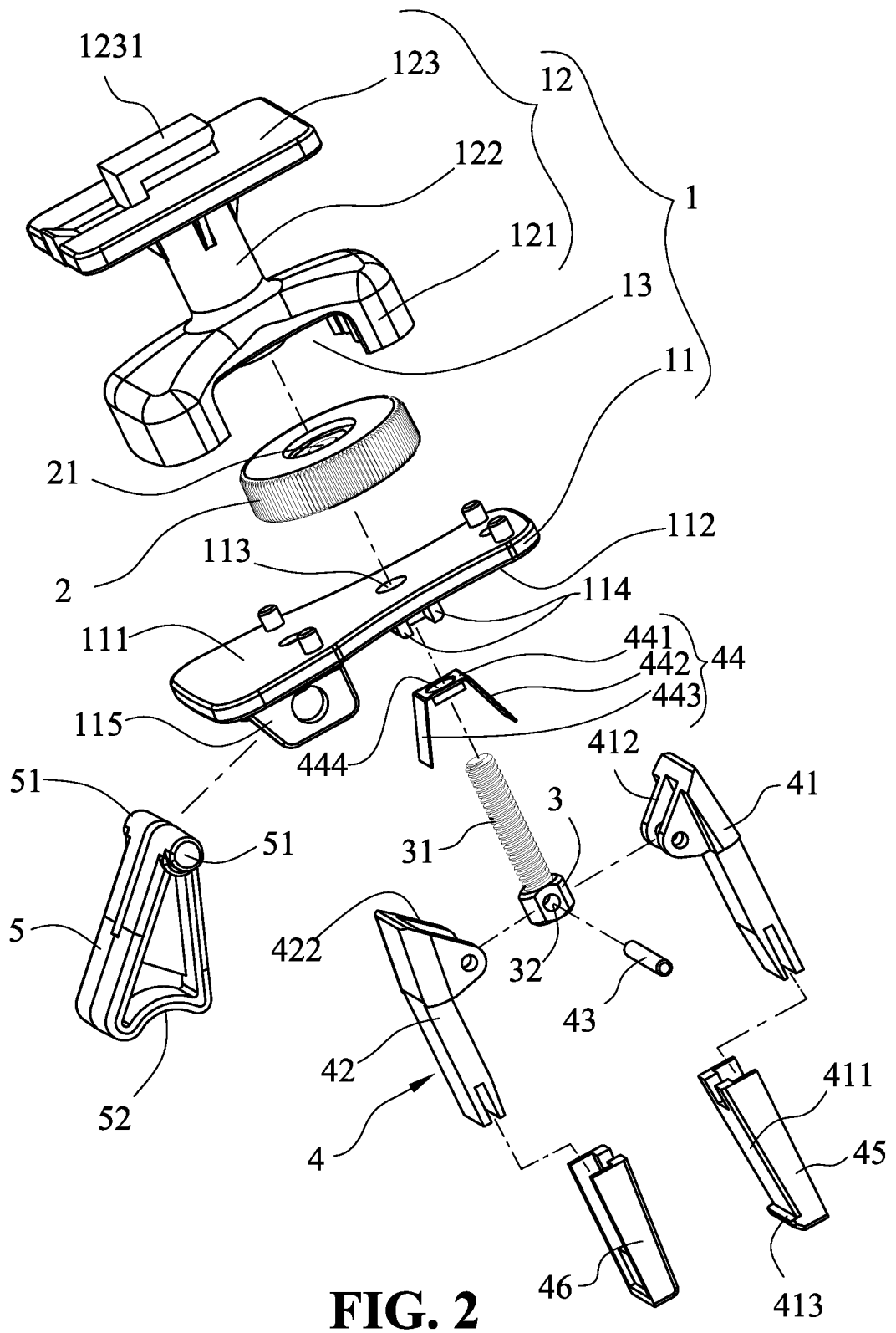
FIG. 2 shows a dissected view of the present invention.
Figure 3:
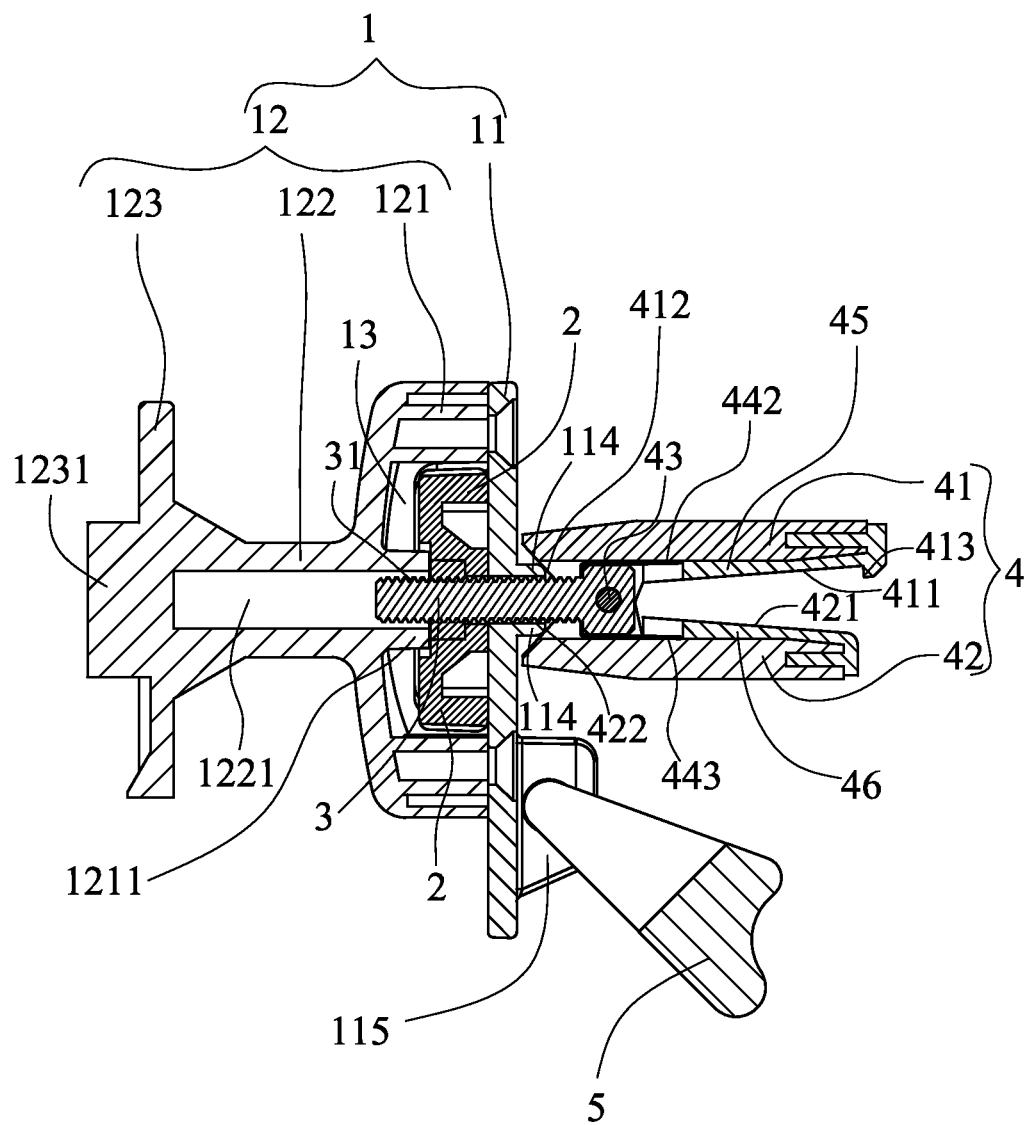
FIG. 3 shows a cross-sectional view of the present invention.
Figure 4:
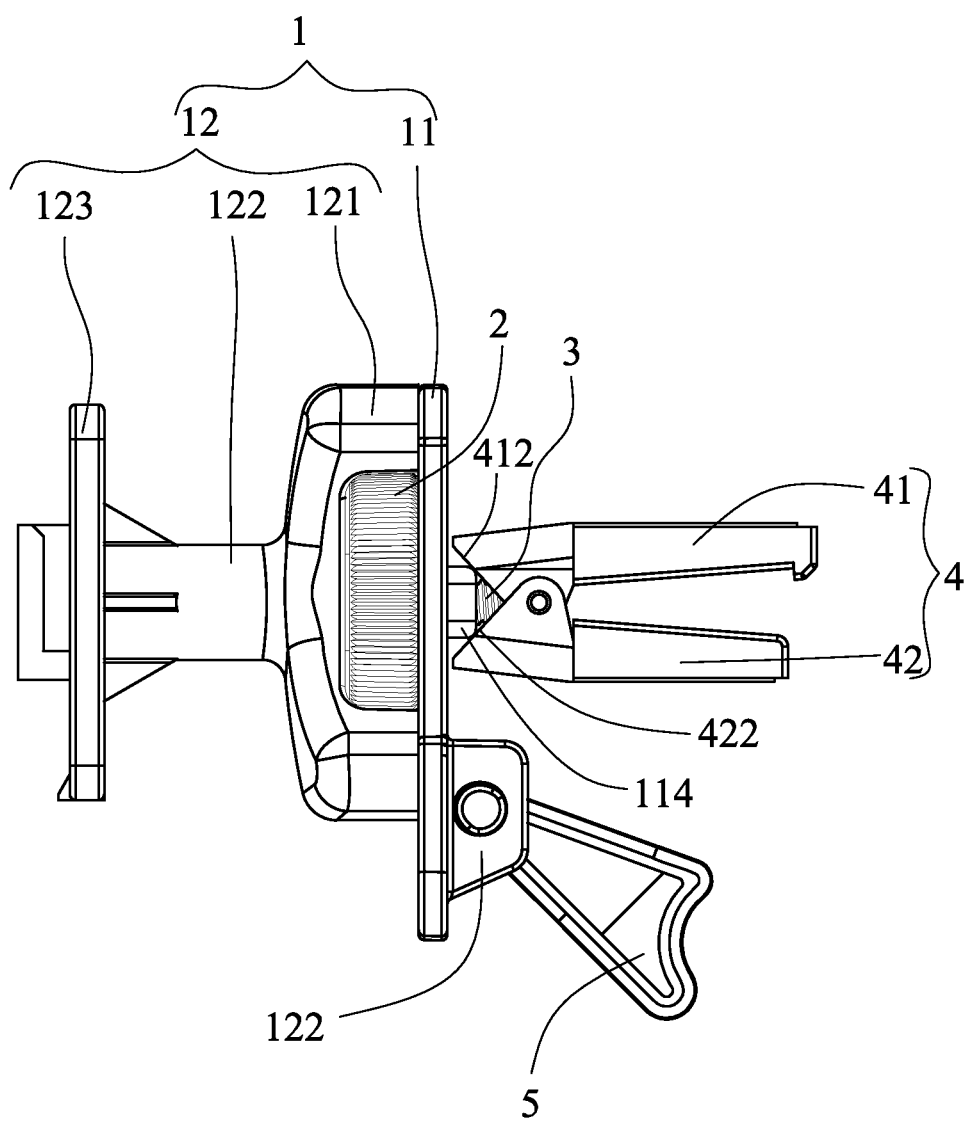
FIG. 4 shows a side view of the present invention.

The following describes the details of the components of the present invention. FIGS. 2-4 show dissected view, cross-sectional view and side view of the present invention respectively. The fixing unit 1 includes a housing plate 11 and a cover element 12. The cover element 12 is shaped partially as ∩. After the cover element 12 is engaged to the housing plate 11, a non-closed space 13 is formed between the two. When assembled, the dial 12 is housed inside the space 13. In addition to engaging to the housing plate 11 to form the space 13, the cover element 12 is mainly for providing connection to other devices. Therefore, the shape of the cover element 12 is not restricted to any specific condition. The present invention provides the following embodiment for illustrative purpose, instead of restrictive purpose. The cover element 12 includes a cover body 121, a support tube 122 and a connection element 123. The cover body 121 is shaped as ∩, with back connecting to the support tube 121. The support tube 121 includes an inside housing space 1221. The housing space 1221 communicates with space 13 formed by the cover body 121. The cover body 121 forms protruding ring 1211 on inner edge of ∩ shape. The protruding ring 1211 contacts the dial 2 when assembled to limit the dial 2 to rotate at fixing unit 1. The connection element 123 is mainly to buckle with other component. In the present embodiment, connection element 123 includes at least an engaging block 1231, shaped as T, i.e., the so-called T buckle.

In addition, the housing plate 11 includes two opposite surfaces, first surface 111 and second surface 112 respectively, and a through hole 113. The dial 2 is located on the first surface 111. The second surface 112 is disposed with the clamp 4 and the support element 5. The second surface 112 also includes at least a protruding block 114 protruding above the surface and an axis set 115. The protruding block 114 is formed on the circumference of through hole 113 and axis set 115 provides coupling to the support element 5.

The center of the dial 2 includes inner screw thread 21. The traction element 3 is shaped as a long rod, with a segment disposed with outer screw thread. For easy manufacturing, the traction element 3 can be a screw bolt. The traction element 3 passes the through hole 113 of the housing plate 11 to engage with inner screw thread 21 of the dial 2, and partially extending into housing space 1221. The one end of the traction element 3 located at a segment of second surface 112 of housing plate 11 includes a coupling hole 32, and the coupling hole 32 is for coupling with the clamp 4.

The clamp 4 includes two coupled clips 41, 42. Each clip 41, 42 uses the coupling position as the center, and includes a clamp wall 411, 421 and a guide wall 412, 422, respectively. In the present embodiment, the guide walls 412, 422 are slanted. When assembled, edge of the protruding block 114 of the housing plate 1 contacts the guide walls 412, 422. The clamp 4 uses an axis 43 to couple clips 41, 42. When assembled, the axis 43 passes through the coupling hole 32 of the traction element 3. As such, when the traction element 3 moves linearly, the clamp 4 is moved by traction. In the present invention, when the clamp 4 moves, the edge of protruding block 114 contacts the guide walls 412, 422 at different locations to achieve the objective of opening and closing of clips 41, 42. To ensure the clamp 4 can automatically open when the external force vanishes, the clamp 4 further includes a resilient element 44. The resilient element 44 includes a plate 441 and two resilient plates 442, 443 on both sides of plate. The plate 441 includes a hole 444 at center. When assembled, the hole 444 allows the traction element 3 to pass through, and the resilient plate 442 applies pressure to inner side of clip 41 and the resilient plate 443 applies pressure to inner side of clip 42. In addition, to ensure anti-slipping when clamping, the clamp wall 411 of clip 41 is made of an anti-slip element 45 with a high friction factor, and the clamp wall 421 of clip 42 is made of an anti-slip element 46 with a high friction factor. The end of clamp wall 411 includes a barb 413 to prevent from disengagement during clamping.

The support element 5 has a fan shape. The support element 5 includes a rotational axis 51. The rotational axis 51 is coupled to axis creel 115 of housing plate 11. The support element 5 includes an arc contact edge 52 away from the rotational axis 51. The contact edge 52 is mainly for contacting interior decoration of the vehicle to maintain the vertical standing position of the fixing unit 1.

Figure 5:
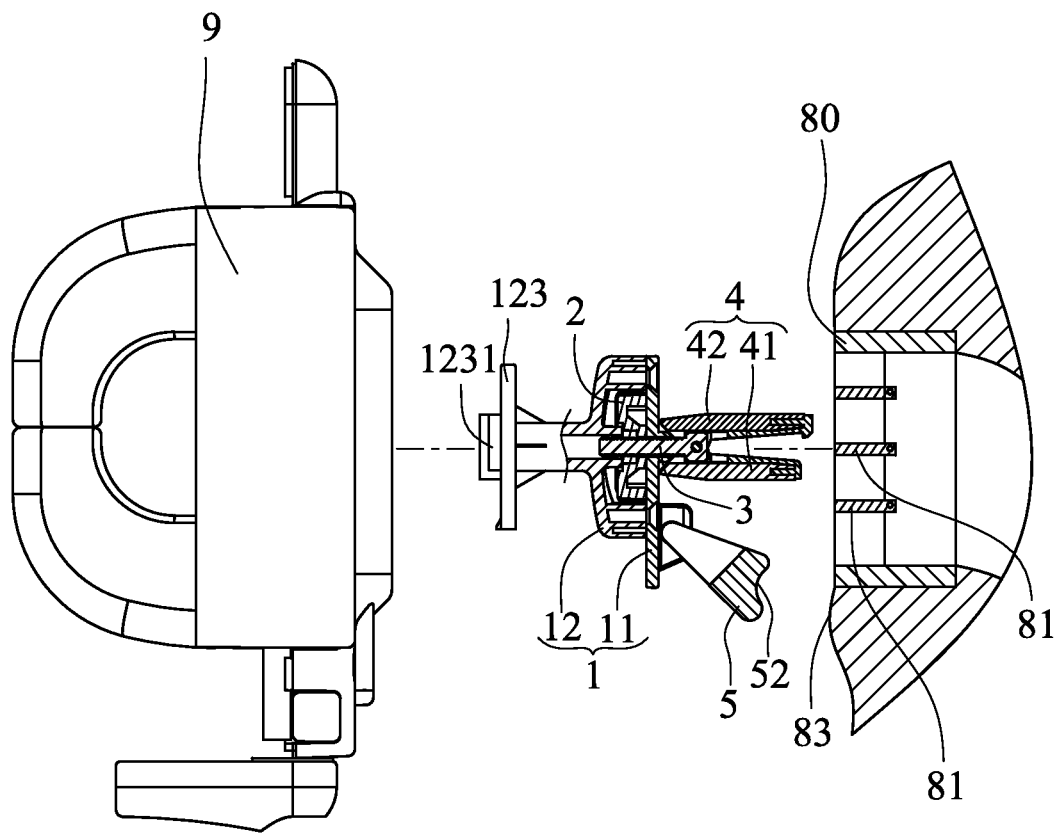
FIG. 5 shows a schematic view of the present invention in actual application.

FIG. 5 shows a schematic view of the present invention in actual application. The air-conditioner vent outlet 80 includes a plurality of fins 81 adjustable to change wind direction. The fixture apparatus of the present invention must rotate the dial 2 to make the traction element 3 to move linearly. At this point, the traction element 3 pulls the clamp 4 to move synchronously. Because the edge of protruding block 114 contacts the guide walls 412, 422, clips 41, 42 can clamp onto fins 81 tightly. As the movement is through linked movement by the dial 2, the clamping of clips 41, 42 are sufficiently tight. In addition, by adjusting the contact edge 52 of the support element 5 at the position of interior decoration surface 83, the optimal vertical standing position of fixing unit 1 can be maintained. In the present embodiment, the fixture apparatus provides connection to a holding clamping device 9. The back of the clamping device 9 includes an engagement trench (not shown) for engagement block 1231 of connection element 123 to insert into so that the two can fixed together. The clamping device 9 is for clamping a portable electronic device.

Figure 6:
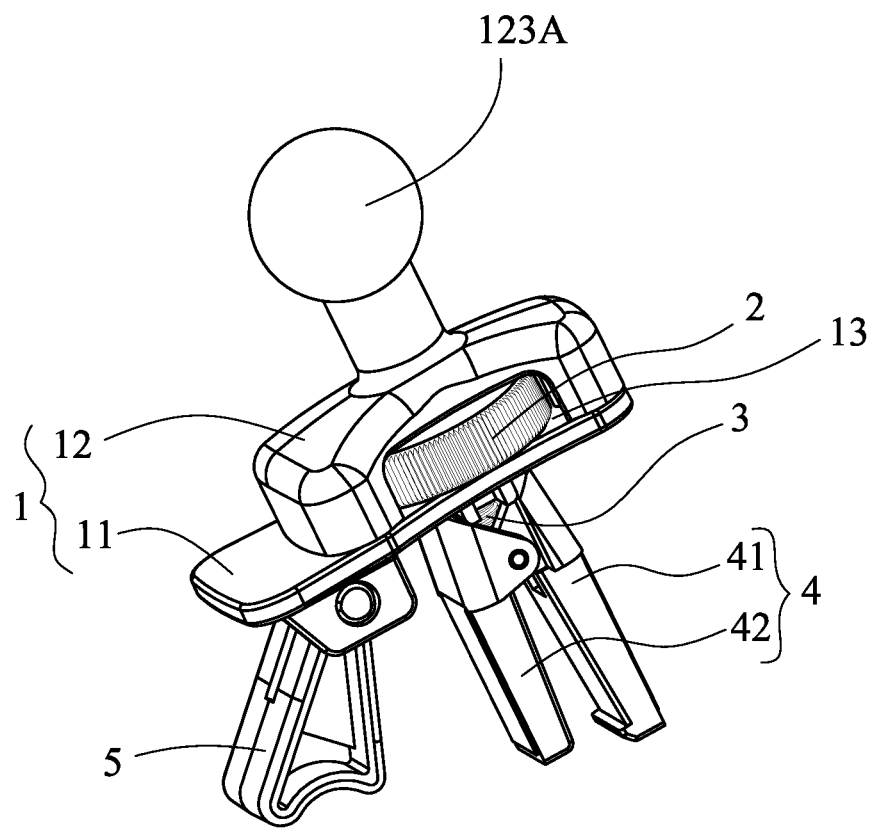
FIG. 6 shows a schematic view of another embodiment of the present invention.

FIG. 6 shows a schematic view of another embodiment of the present invention. The embodiment provides a different shape of cover element 12. The connection element 123A of the cover element 12 has a sphere shape. As shown in this embodiment, the shape of cover element depends on the device to be connected to and is not restricted to any specific shape.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A fixture apparatus for attaching to an air-conditioning vent outlet, comprising:
   a dial, a center of the dial including an inner screw thread hole and an inner screw thread in the inner screw thread hole;
   a fixing unit being installed with the dial and limiting the dial to only rotate at one location, the fixing unit including
      a housing plate including a through hole, and
      a cover element including a cover body, a support tube and a connection element, the cover body having an inverted U-shape with a back of the inverted U-shape connecting to the support tube, the support tube including an inside housing space, the housing space communicating with a space formed by the cover body, the cover body forming a protruding ring on an inner edge of the inverted U-shape, the protruding ring directly contacting the dial to limit the dial to rotate at the fixing unit, the cover body being engaged to the housing plate so that a non-closed space is formed between the cover body and the housing plate, the dial being housed inside the non-closed space and being able to rotate by an external force applied by a user,
      wherein an outer surface of the housing plate at the dial forms a protruding block and the protruding block is located at an outer wall of the housing plate near the through hole;
   a traction element having a segment that has an outer screw thread, the segment extending into the fixing unit and contacting the dial in a screw-like manner, the traction element passing through the through hole of the housing plate to engage with the inner screw thread of the dial and to partially extend into the housing space, the outer screw thread engaging with the inner screw thread so that when the dial is rotated the traction element moves linearly;

a clamp including two coupled clips, the clips having a coupling position at a center of the clips, each of the clips comprising a clamp wall and a guide wall on opposite sides from each other, the guide walls contacting an edge of the protruding block at the location of the dial, the clips being coupled to one end of the traction element that is outside of the fixing unit at the coupling position, each of the guide walls is slanted, and when the clamp moves, a position where the edge of the protruding block contacts the guide walls also changes so that the clips can open or close so as to clamp an object; and a support element being coupled to the outer wall of the housing plate and being located on a same side of the fixing unit as the clamp.

2. The fixture apparatus as claimed in claim 1, wherein the clamp further comprises a resilient element disposed between the clamp walls to make the two coupled clips open when an external force applied to the fixture apparatus vanishes.

3. The fixture apparatus as claimed in claim 1, wherein the clamp walls are made of an anti-slip element with a high friction factor.

4. The fixture apparatus as claimed in claim 1, wherein the support element is partially coupled to the outer wall of the fixing unit, with an arc contact edge disposed away from the coupling position.

5. The fixture apparatus as claimed in claim 1, wherein an outer shape of the connection element depends on a structure of a device to engage with the connection element.

6. The fixture apparatus as claimed in claim 1, wherein the traction element is capable of moving relative to the dial.

7. The fixture apparatus as claimed in claim 1, wherein the dial is disposed within the non-closed space so that a portion of the dial is accessible to a user, while another portion of the dial is inaccessible to the user.

8. The fixture apparatus as claimed in claim 1, wherein the fixing unit, the dial, the traction element and the clamp are disposed in that stated order on a single straight line.

* * * * *